United States Patent
Aoki

[19]

[11] Patent Number: 6,062,550
[45] Date of Patent: May 16, 2000

[54] VIBRATION INSULATING DEVICE

[75] Inventor: Kazushige Aoki, Yokosuka, Japan

[73] Assignee: Nissan Motor Co., Ltd., Kanagawa, Japan

[21] Appl. No.: 08/571,796

[22] Filed: Dec. 13, 1995

[30] Foreign Application Priority Data

Dec. 22, 1994 [JP] Japan .................................. 6-321067

[51] Int. Cl.[7] .................................................. F16F 13/00
[52] U.S. Cl. ........................................ 267/140.13; 180/312
[58] Field of Search ...................... 267/140.13, 140.14; 180/312; 248/550

[56] References Cited

U.S. PATENT DOCUMENTS

| | | | |
|---|---|---|---|
| 5,042,786 | 8/1991 | Freudenberg et al. ............. | 267/140.14 |
| 5,052,662 | 10/1991 | Doi ..................................... | 267/140.14 |
| 5,277,409 | 1/1994 | Goto et al. ......................... | 267/140.14 |
| 5,366,211 | 11/1994 | Hamada et al. . | |
| 5,388,812 | 2/1995 | Kojima et al. ..................... | 267/140.14 |
| 5,601,280 | 2/1997 | Nagaya et al. ..................... | 267/140.14 |

FOREIGN PATENT DOCUMENTS

| | | |
|---|---|---|
| 44 02 086 A1 | 7/1994 | Denmark . |
| 404131538 | 5/1992 | Japan ................................. 267/140.14 |
| 405164182 | 6/1993 | Japan ................................. 267/140.14 |
| 5-332392 | 12/1993 | Japan . |
| 2 164 416A | 3/1986 | United Kingdom . |
| 2 278 180 | 11/1994 | United Kingdom .............. 267/140.13 |

*Primary Examiner*—Robert J. Oberleitner
*Assistant Examiner*—Pamela J. Lipka
*Attorney, Agent, or Firm*—McDermott, Will & Emery

[57] ABSTRACT

A fluid sealed type vibration insulating device provided with an actuator for generating an active supporting force. The vibration insulating support device includes a main fluid chamber defined by a cylindrical elastic support and a movable plate connected to a non-linear type plate spring. The main fluid chamber is fluidly communicated with a variable-volume auxiliary fluid chamber through an orifice. The actuator moves the movable plate to change a dynamic spring characteristic and a damping characteristic of a fluid resonance system constituted by a mass of fluid in the orifice and a spring of an expanding direction of the elastic support and the plate spring. Therefore, a required output of the actuator is suppressed.

14 Claims, 11 Drawing Sheets

VIBRATION INSULATING DEVICE

BACKGROUND OF THE INVENTION

1. Field of the Invention

The present invention relates to a device for insulating vibrations and supporting a vibration generating means such as an engine of a vehicle, and more particularly to a so-called fluid sealed type vibration insulating device which is arranged to sufficiently decrease a large magnitude vibration input without providing a large and expensive device.

2. Description of the Prior Art

Generally, an engine mount functions as a vibration insulating device in use for supporting a power unit of a vehicle and is mainly required to perform a vibration insulating function relative to vibrations due to an idling, an echo sound and noises during a vehicle acceleration. However, in order to reduce such idling vibrations, which have a relatively large magnitude ranging from about 20 to 30 Hz, the vibration insulating support device is required to have characteristics of a high dynamic spring constant and a high damping. In contrast, in order to reduce echo sound vibration and/or acceleration vibrations, which are of a vibration of a relatively small magnitude ranging from about 80 to 800 Hz, the vibration insulating device is required to have characteristics of a low dynamic spring constant and the low damping. Accordingly, it is difficult to insulate all vibrations by a normal elastic engine mount or by an engine mount of a conventional fluid sealed type.

Japanese Patent Provisional Publication No. 5-332392 discloses a fluid sealed type vibration insulating device which is able to generate an active supporting force. This vibration insulating device is provided with an inner cylinder fixed to one of a vibrating means and a structural member, an outer cylinder fixed to the other one of the vibrating means and the structural member while surrounding the inner cylinder, an elastic support disposed between the inner and outer cylinders, a main fluid chamber defined by the elastic support, an auxiliary fluid chamber variable in volume, an orifice communicating the main fluid chamber and the auxiliary fluid chamber, fluid sealed in the main fluid chamber, the auxiliary fluid chamber and the orifice, a movable plate displaceable in the direction for changing the volume of the main fluid chamber, and an actuator driven by the movable plate. This conventional vibration insulating device is arranged to generate a desired damping force by flowing the fluid through the orifice and to generate an active supporting force by elastically deforming an expanding directional functioning spring of the elastic support due to the displacement of the movable plate.

Accordingly, this conventional vibration insulating device functions to increase its output efficiency by setting a value of a ratio (A2/A1) of pressure receiving areas at 0.3 to 0.8, because the magnitude of the active supporting force is influenced by the ratio between a pressure receiving area A1 which is the result of dividing of a volume change at the expansion of the elastic support due to the fluid deviation by the expanding directional displacement of the elastic support and a pressure receiving area A2 which is the result of dividing a volume change of the main fluid chamber relative to the movable plate by the displacement of the movable plate.

SUMMARY OF THE INVENTION

However, this conventional vibration insulating device yet has a problem that the power inputted to the main fluid chamber must be increased by enlarging the actuator for generating the supporting force in order to obtain a preferable vibration reducing effect, such as to sufficiently cancel the large-magnitude idle vibration generated at a low engine rotation speed condition of a stopping diesel-engine vehicle, even if the output efficiency of the vibration insulating device is improved by selecting the ratio of the pressure receiving areas. Particularly, such enlargement of the actuator invites the increase of the cost and generates some difficulties.

It is an object of the present invention to provide a vibration insulating device which can generate a supporting force for reducing a large vibration of a large magnitude without using a large actuator.

A vibration insulating device according to the present invention is disposed between a vibrating means and a structural member. The vibrating means generates a periodic vibration. The vibration insulating device comprises a main fluid chamber and an elastic support partly defining the main fluid chamber. An orifice is connected to the main fluid chamber. An auxiliary fluid chamber of a volume-variable type is fluidly communicated with the main chamber through the orifice. Fluid is filled in the main fluid chamber, the orifice and the auxiliary fluid chamber. A movable plate partly defines the main fluid chamber. An elastic plate elastically supports the movable plate so that the movable plate is displaced to change the volume of the main fluid chamber, the elastic plate performs a non-linear spring characteristic. An actuator generates a displacement force for displacing the movable plate.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 9, there is shown a first embodiment of a vibration insulating device according to the present invention.

Figure 1:
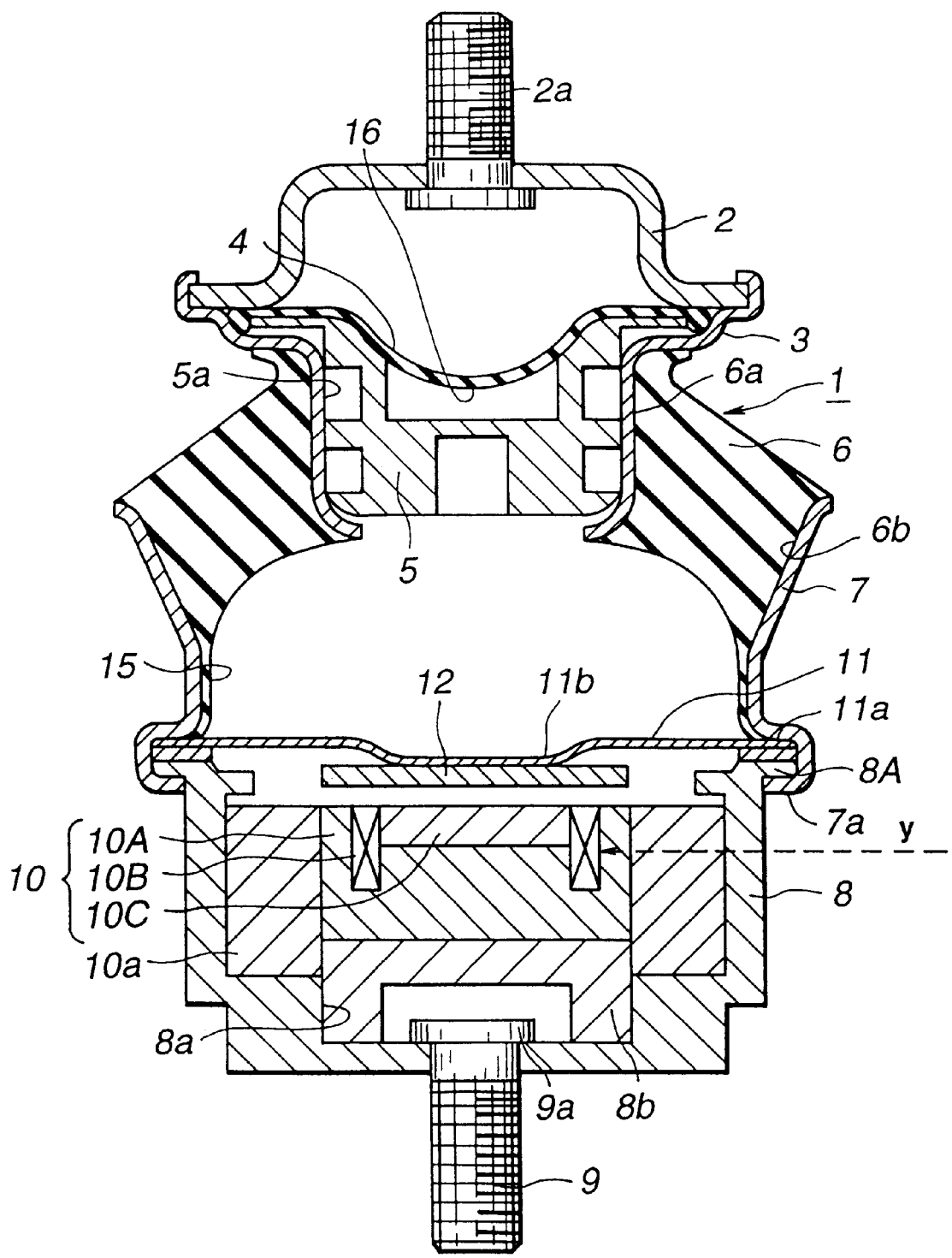
FIG. 1 is a cross-sectional view which shows a structure of a first embodiment of a vibration insulating device according to the present invention.
Figure 2:
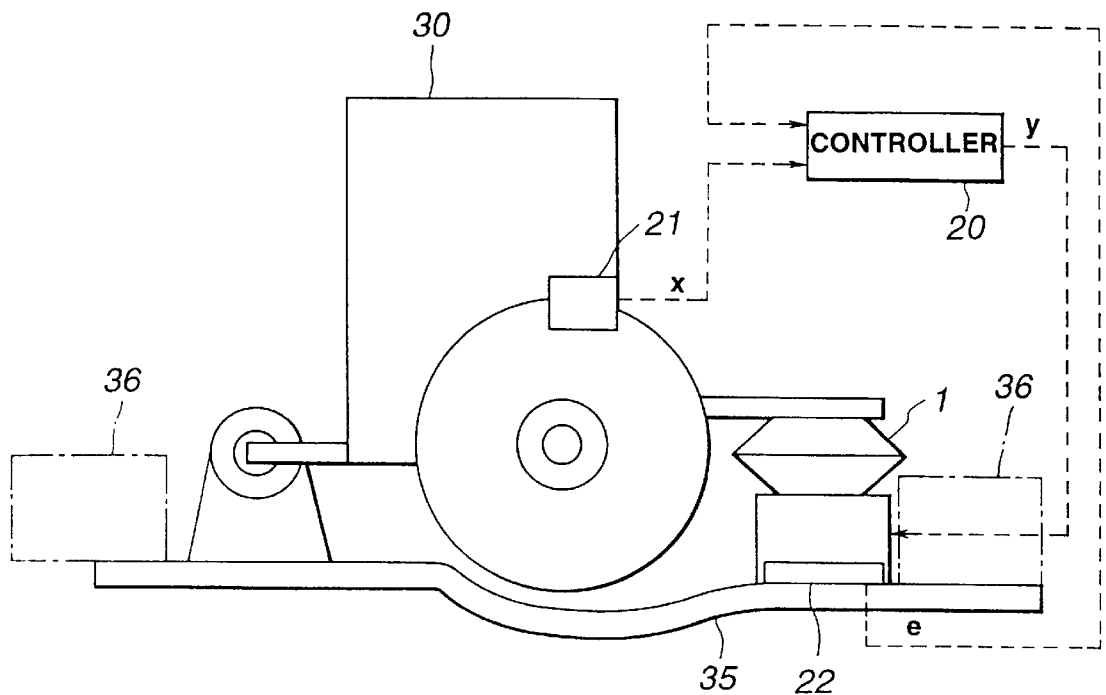
FIG. 2 is a whole structural view which shows an equipped condition of the first embodiment.

As shown in FIGS. 1 and 2, the vibration insulating device according to the present invention is applied to a so-called active engine mount 1 which actively decreases vibrations transferred from an engine 30 to a supporting member (or structural member) fixed to a vehicle body 36. The engine mount 1 comprises an installation bolt 2a through which the engine mount 1 is connected with the engine 30. Integrally connected with the installation bolt 2a is an installation part 2 formed into a cup-shape. The installation part 2 forms a hollow by its inner surface and has an open round peripheral 2b. The open round peripheral 2b of the installation part 2 is caulked with an upper end portion of an inner cylinder 3.

A diaphragm 4 is disposed inside of the inner cylinder 3 so as to divide an inner space defined by the installation part 2 and the inner cylinder 3 into upper and lower parts. An outer periphery 15a of the diaphragm 4 clamped by the installation part 2 and the inner cylinder 3 by means of a caulking therebetween. An orifice construction part 5 is disposed in the inner cylinder and under the diaphragm.

An inner surface 6a of a cylindrical elastomer 6 is vulcanizedly connected with an outer surface of the inner cylinder 3. The supporting elastomer 6 of a generally cylindrical shape is formed such that the inner surface 6a is higher than an outer surface 6b in height level along the axial direction. The outer surface 6b of the supporting elastomer 6 is vulcanizedly connected with an inner surface of an outer cylinder 7.

A lower end portion 7a of the outer cylinder 7 is caulked with a flange portion 8A of an actuator case 8. The actuator case 8 is formed into a cup-shape which is cylindrical and upwardly opened. An installation bolt 9 for installing the engine mount 1 to the structural member 35 is projected from a lower end surface of the actuator case 8. A head portion 9a of the installation bolt 9 is received in a hollow portion of a cap 8b which is engaged with a depressed portion 8a of the actuator case 8.

Furthermore, an electromagnetic actuator 10 is fittingly disposed in the actuator case 8. The electromagnetic actuator 10 is constituted by a cylindrical yoke 10A which is fixed to an upper surface of the cap 8b so as to be coaxial with the actuator case 8, an exciting coil 10B which is formed of a circular coil wound round the vertical axis in the yoke 10A, and a permanent magnet 10C which is fixed to an upper surface of a part surrounded by the exciting coil 10B so as to form a polarity in the vertical direction. An adapter 10a for fixing the electromagnetic actuator 10 is disposed between the inner peripheral surface of the actuator case 8 and an outer peripheral surface of the electromagnetic actuator 10.

A plate spring 11 made of a metal disc is disposed above the electromagnetic actuator 10 so as to cover an opening portion side of the actuator case 8. An outer peripheral portion 11a of the plate spring 11 is integrally clamped between the flange portion 8A of the actuator case 8 and the lower end portion of the outer cylinder 7. The plate spring 11 functioning as an elastic plate performs according to a non-linear type spring characteristic so that a spring constant is changed according to its elastic deformation amount. A disc-shaped magnetic path member 12 functioning as a movable plate is made of a magnetizable material such as iron and is fixed to a center portion 11b of a lower surface of the plate spring 11 by means of a rivet or the like so as to form a predetermined clearance relative to the upper surface of the electromagnetic actuator 10.

Furthermore, a main fluid chamber 15 is defined by the lower surface of the supporting elastomer 6 and the upper surface of the plate spring 11. An auxiliary fluid chamber 16 is defined by the diaphragm 4 and the orifice construction member 5. The orifice 5a formed by the orifice construction part 5 communicates the main fluid chamber 15 and the auxiliary fluid chamber 16. The main fluid chamber 15, the auxiliary chamber 16 and the orifice 15a are filled with fluid such as oil.

A fluid resonance system in the engine mount 1 is constituted by a mass of the fluid in the orifice 5a, the expanding directional spring of the supporting elastomer 6 and the plate spring 11. The fluid resonance system is arranged to perform a characteristic so that a damping peak frequency during a non-control time shown in FIG. 3 corresponds to a frequency of an idle vibration generated during a vehicle stopping condition. Wherein the damping peak frequency is a frequency at which the damping of the vibration becomes maximum, and the non-control time is a time when the external force such as a controlling force from the electromagnetic actuator 10 to the magnetic path 12 is not applied.

The exciting coil 10B of the electromagnetic actuator 10 is electrically connected with a controller 20 functioning as an electromagnetic actuator controlling means through a harness. The exciting coil 10B generates a predetermined electromagnetic force according to a drive signal y which is a drive current supplied from the controller 20. The controller 20 includes a micro-computer, various interface circuits, an A/D converter, a D/A converter and an amplifier. When the controller 20 detects that the engine 30 is generating the idle vibration or high-frequency vibrations such as that of echo sound vibration, the controller 20 generates a control vibration and supplies it to the engine mount 1 so that the engine generated vibration is not transferred to the structural member 35, more specifically, that an exciting force inputted to the engine mount 1 due to the vibration at the engine 30 is canceled by a controlling force generated by the electromagnetic force of the electromagnetic actuator 10.

In case that the engine mount 1 is applied to a reciprocated four cylinder engine, the idle vibration and the echo vibration are mainly caused by the transmitting of an engine vibration of a second component of the engine rotation through the engine mount 1 to the structural member 35. Accordingly, it is possible to reduce the vibration transmitting ratio by generating and outputting the drive signal upon synchronizing the signal with the secondary component of the engine rotation.

A pulse signal generator 21 is installed to the engine 30 and is electrically connected with the controller 20. The pulse signal generator 21 generates an impulse signal synchronized with the rotation of a crankshaft of the engine 30, for example, once by each 180° angular rotation of the crankshaft in case of the reciprocated four cylinder engine, and outputs as a reference signal x. The reference signal x is supplied to the controller 20 as a signal representative of a vibration generated at the engine 30. An acceleration sensor 22 is fixedly installed to the structural member 35 in the vicinity of the connecting portion of the engine mount 1. The acceleration sensor 22 detects a vibration condition of the structural member 35 in the form of an acceleration and outputs as a residual vibration signal e. The residual vibration signal e is supplied to the controller 20 as a signal representative of a vibration after the interference by the engine mount 1.

The controller 20 generates and outputs the drive signal y on the basis of the reference signal x and the residual vibration signal e according to the Filtered-X LSM algorithm, more particularly to the synchronized Filtered-X LSM algorithm. That is, the controller 20 includes an adaptive digital filter W which variably changes a filter coefficient $W_i$ where i=0, 1, 2, . . . , I-1, and I is a number of taps. From a time the newest reference signal x is inputted, by predetermined sampling-clock intervals, the filter coefficient $W_1$ of the adaptive digital filter W is in turn outputted as a drive signal y, and an appropriate updating process of the filter coefficient $W_i$ of the adaptive digital filter W is executed according to the reference signal x and the residual vibration signal e. Furthermore, in order to control the neutral point of the displacement generation of the magnetic path member 12 at a desired position, the sum of the filter coefficient Wi and the predetermined offset component is outputted as a drive signal y without merely outputting the filter coefficient Wi as a drive signal.

An updating equation of the adaptive digital filter W is represented by the following equation (1) based on the Filtered-X LMS algorithm.

$$Wi(n+1)=Wi(n)-\mu R^T e(n) \quad (1)$$

wherein a term including (n) represents a value at time n, m is a coefficient called as a convergence coefficient and related to the converging speed of the filter coefficient Wi and its stability. $R^T$ is, theoretically, a Filtered-X signal obtained by filter-processing the reference signal x by means of a model transfer function filter C^which is a model of a transfer function C between the force generated at the electromagnetic actuator 10 and the acceleration sensor 22. The reference signal x is an impulse-train as a result of the application of the synchronized-type Filtered-X LMS algorithm. Accordingly, in case that an impulse responses of the transfer function filter C^ are in turn generated synchronizing with the reference signals x, $R^T$ corresponds to the sum of these impulse response wave forms at the time n.

The transfer function C^ is divided into a first transfer function filter C1^ corresponding to a component obtained by eliminating a resonance frequency component of the fluid resonance system and a resonance frequency component of the magnetic path 12 from the transfer function C between the force generated at the electromagnetic actuator 10 and the acceleration sensor 22, a second transfer function filter C2^ corresponding to the resonance frequency component of the fluid resonance system and a third transfer filter C3^ corresponding to a resonance frequency component of the movable plate. The first, second and third transfer function filters C1^, C2^, and C3^ are stored in the controller 20. A filter coefficient of the first transfer function filter CIA is fixed, and filter coefficients of the respective second and third transfer function filters C2^ and C3^ are switched according to a DC voltage applied to the electromagnetic actuator 10.

Theoretically, the drive signal y is generated by filtering the reference signal x by means of the adaptive digital filter W, and this filtering process corresponds to a convolution calculation in the digital calculation. Since the reference signal x is a impulse train, by outputting each filter coefficient Wi of the adaptive digital filter W as a drive signal y in turn at predetermined sampling-clock intervals from a time that the newest reference signal x is inputted, the same result is obtained as in a case that the result of the filter process is took as a drive signal y.

Figure 4:
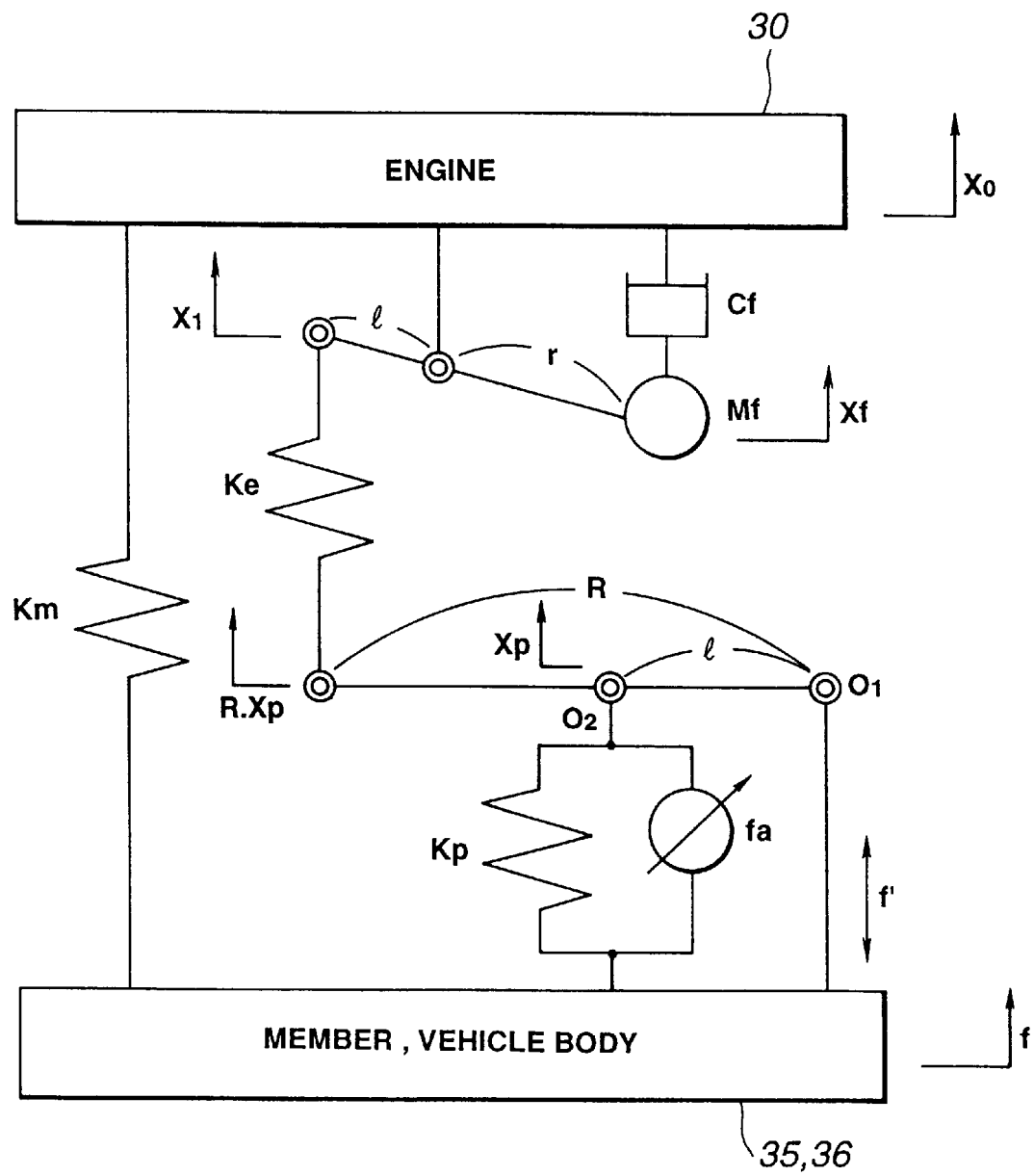
FIG. 4 is a view representing a modeled engine mount of the first embodiment.

FIG. 4 shows a model of the engine mount 1 of the first embodiment according to the present invention. In FIG. 4, $M_f$ is a mass [kg] of the fluid in the orifice 5a, $C_f$ is a fluid viscosity damping coefficient, $K_m$ is a supporting-directional spring constant [N/m] of the supporting elastomer 6, $K_e$ is an expanding-directional spring constant [N/m] of the supporting elastomer 6, $K_p$ is a spring constant [N/m] of a plate spring 11, $f_a$ is a controlling force applied to the magnetic path member 12 by the electromagnetic actuator 10, $x_0$ is a displacement [m] inputted from the engine 30 to the engine mount 1, $x_f$ is a displacement of the fluid in the orifice 5a, $x_1$ is a displacement [m] at an upper portion of an expanding-directional spring of the supporting elastomer 6, $x_p$ is a displacement [m] of the magnetic path member 12, f' is a fulcrum reaction force [N], f is a transmission force [N] to the structural member 35, R is a ratio $(A_p/A_u)$ between an effective pressure receiving area $A_u$ [m²] of the expanding-directional spring of the supporting elastomer 6 and an effective pressure receiving area $A_p$[m²] of the magnetic path member 12, and r is a ratio $(A_u/A_0)$ between the effective pressure receiving area $A_u$ and the pressure receiving area $A_0$ of a hole of the orifice 5a.

The equation of motion of this model is represented by the following equation (2), the equation of the lever balance is represented by the following equation (3), the equations of moment balance around the fulcrums O1 and O2 are represented by the following equations (4) and (5), respectively, and the transfer equation of the force of the engine mount 1 is represented by the equation (6).

$$M_f(dx_f^2/dt^2)+C_f(dx_f/dt-dx_0/dt)-(1/r)Ke(x_1-Rx_p)=0 \quad (2)$$

$$(x_f-x_0)=r(x_1-x_0) \quad (3)$$

$$R \cdot Ke(x_1-R \cdot x_p)-K_p \cdot x_p+f_a=0 \quad (4)$$

$$(R-1)Ke(x_1-R \cdot x_p)-f'0 \quad (5)$$

$$f=K_m \cdot x_0-fa+K_p \cdot x_p-f' \quad (6)$$

Figure 3:
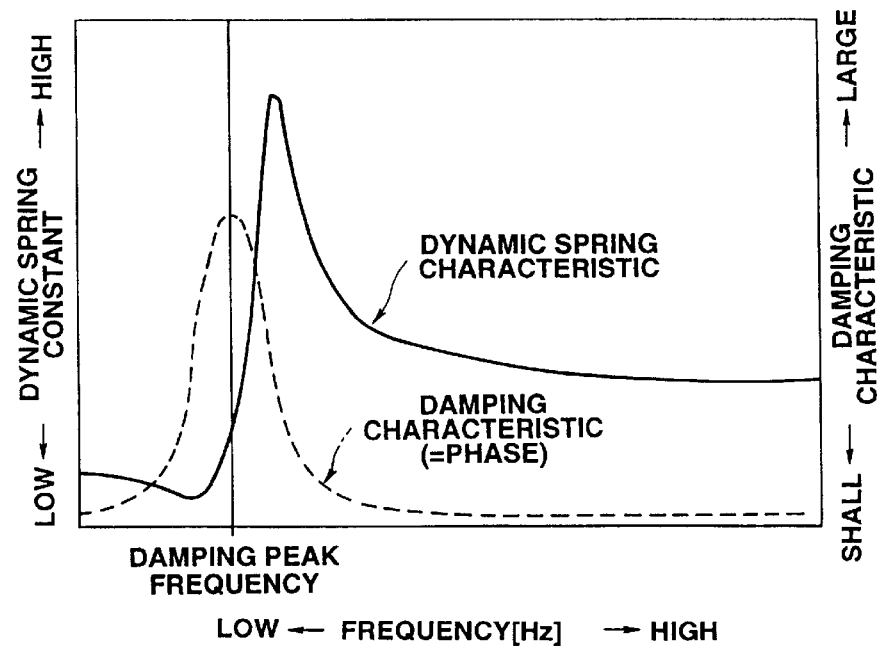
FIG. 3 is a frequency characteristic diagram which shows a dynamic spring characteristic and a damping characteristic of the vibration insulating device of the first embodiment.

If the controlling force fa of the electromagnetic actuator 10 is set at 0 in the equation (6), it shows a characteristic of the fluid sealing type engine mount 1, and its dynamic spring constant and damping characteristics are represented by a continuous line and a broken line shown in FIG. 3. In contrast, a controlling force required to the electromagnetic actuator 10 for setting the transfer force f in the equation (6) to 0 has a characteristic shown in FIG. 5, and becomes minimum at the damping peak frequency shown in FIG. 3. This is owing to that a force passively generated by the resonance of the fluid passing through the orifice 5a during the control execution is added to the positive controlling force generated by the electromagnetic actuator 10, and the load of the electromagnetic actuator 10 is decreased if the total controlling force is constant. However, as is clear from FIG. 5, if the control frequency (frequency of vibration) is shifted from its damping peak frequency, a controlling force required to the electromagnetic actuator 10 increases.

Figure 6:
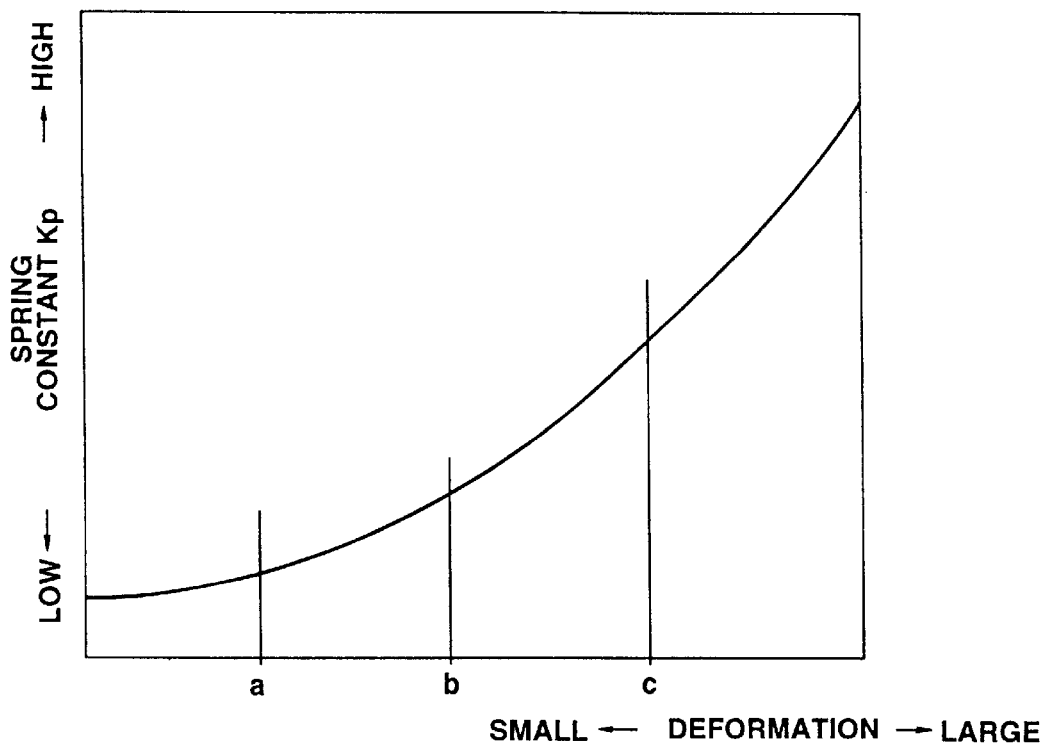
FIG. 6 is a view which shows a relationship between a deformation amount of a plate spring and a spring constant of the first embodiment.

FIG. 6 shows a relationship between the deformation amount and the spring constant of the non-linear type plate spring 11. The lateral axis of the graph of FIG. 6 indicates the deformation amount of the plate spring 11, a point a indicates a deformed condition only by a weight of the magnetic path member 12, points b and c indicate the respective drawn conditions of the plate spring 11 by the electromagnetic actuator 10 due to its electromagnetic force.

Figure 7A:
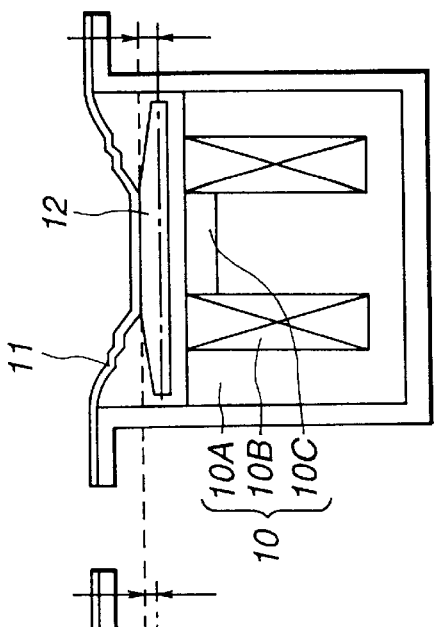
FIG. 7A, 7B and 7C are cross-sectional views of an essential part which show a change of the deformed condition of the plate spring of the first embodiment.
Figure 7B:
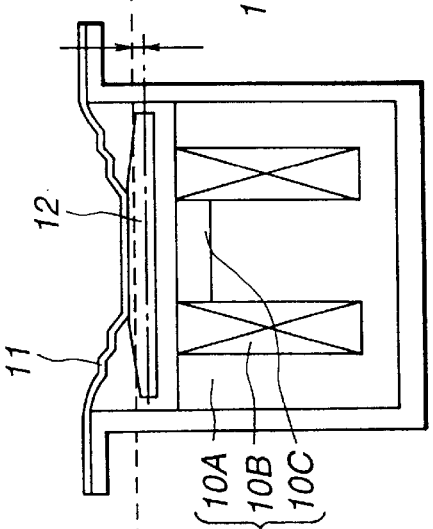
Figure 7C:
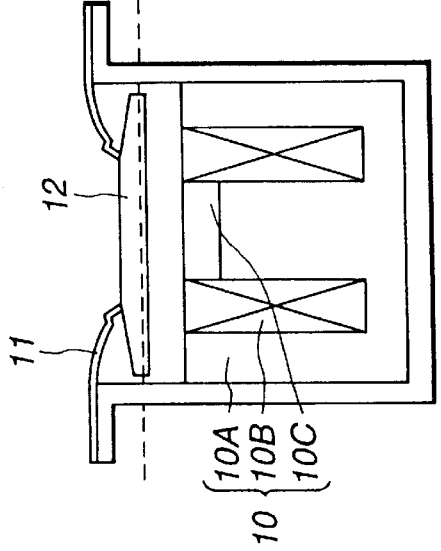

FIGS. 7(a) to 7(c) show displacement conditions of the magnetic path member 12, and correspond to the respective points a to c of FIG. 6. That is, the spring constant Kp of the plate spring 11 is arranged to become greater as the electromagnetic actuator 10 displaces greater. Since the plate spring 11 constitutes a part of the fluid resonance system, the characteristic of the fluid resonance system is changed when the spring constant is changed. Therefore, the dynamic spring characteristic and the damping characteristic of the engine mount 1, which are generally determined by the spring constant characteristic, are also changed. More particularly, according to the increase of the spring constant Kp of the plate spring 11, the dynamic spring characteristic and the damping characteristic are changed from the curves a through the curve b to the curve C shown in FIG. 8. Also, the respective characteristics a to c of FIG. 8 correspond to the respective points a to c of FIG. 6.

Figure 5:
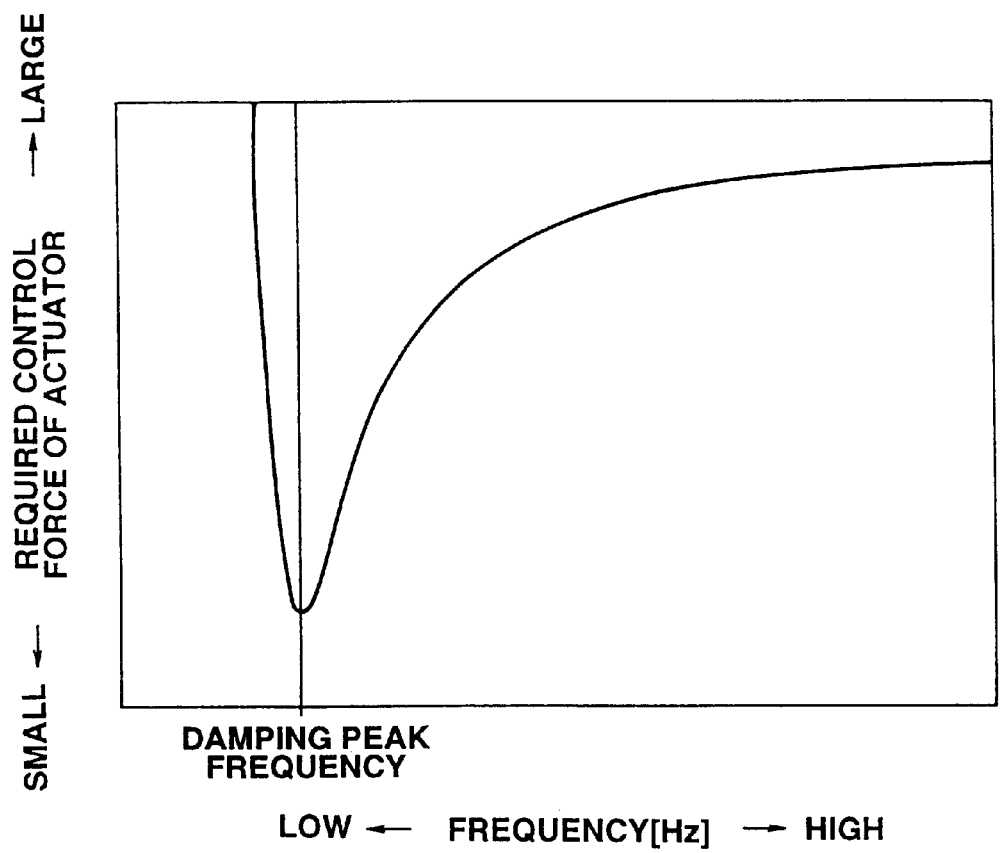
FIG. 5 is a frequency characteristic diagram of an actuator required controlling force in the first embodiment.
Figure 8:
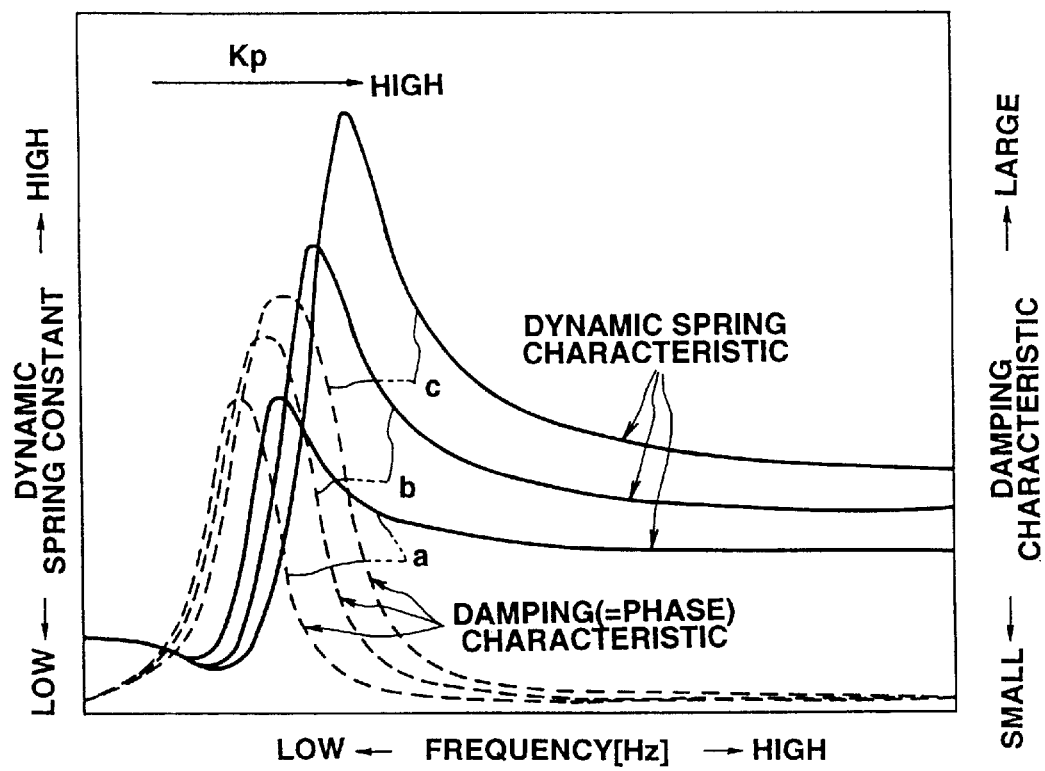
FIG. 8 is a frequency characteristic diagram which shows changes of a dynamic spring characteristic and a damping characteristic of a fluid resonance system relative to a change of a spring constant of the plate spring.

As clear from FIG. 8, the damping peak frequency is changed by the change of the spring constant Kp which is executed by controlling the deformation amount of the plate spring 11, practically by displacing the magnetic path member 12. Also, the required controlling force of the electromagnetic actuator 10 becomes minimum at the damping peak frequency as shown in FIG. 5. Consequently, by properly displacing the displacement generation neutral position of the magnetic path member 12, the frequency, which minimizes the actuator required controlling force, is corresponded to the frequency of the vibration.

The controller 20 is arranged to execute the active vibration reducing control and to execute a control for moving the displacement generation neutral position of the magnetic path member 12 so as to minimize the required controlling force of the electromagnetic actuator 10. More particularly, the controller 20 is arranged to execute a control for properly changing the magnitude of the DC voltage applied to the exciting coil 10B of the electromagnetic actuator 10 so as to move the displacement generation neutral position of the magnetic path member 12 to an offset position at which the vibration insulating effect is improved and the electric power consumption of the electromagnetic actuator 10 is decreased, when it is judged that the frequency of the vibration generated at the engine 30 is constant and that the filter coefficient Wi of the adaptive digital filter W is sufficiently converged into an optimum value.

The operation of the first embodiment of the vibration insulating support device according to the present invention will be discussed hereinafter.

When the controller 20 detects the vibration of the engine 30 which vibration has a frequency higher than the idle vibration frequency, the controller 20 executes a predetermined calculation process and outputs the drive signal y to the electromagnetic actuator 10. That is, a positive controlling force is generated in the engine mount 1 in order to reduce the vibration of the engine at the engine mount 1. This will be discussed in detail with reference to a flowchart of FIG. 9. One-cycle processing is executed synchronized with the reference signals x of an impulse train, and one sampling processing is executed synchronized with a clock-pulses of predetermined time intervals which are started at an input timing of the reference signal x.

First, in a step 101 a predetermined initialization of the controller 20 is executed. Then, the routine proceeds to a step 102 wherein the first to third transfer function filters C1^ to C3^ stored in the predetermined memory of the controller 20 is read out In a step 103, a counter i for counting the number of output times of the drive signals y per one cycle is cleared. Then, the routine proceeds to a step 104 wherein the sum Ty1 of the drive signals y is substituted for the sum Ty2 of the drive signals and temporally stored in the controller 20, and the sum Ty1 of the drive signals is reset to 0. Where the drive signal sum Ty1 is calculated at the newest cycle and the drive signal sum Ty2 is calculated at the previous cycle.

In a step 105, the controller 20 calculates the drive signal y by adding the i-th filter coefficient Wi of the adaptive digital filter W and an offset drive signal ydc indicative of a DC voltage (y=Wi+ydc).

In a step 106, the controller 20 outputs the calculated drive signal y to the exciting coil 10B of the electromagnetic actuator 10.

Next, the routine proceeds to a step 107 wherein the drive signal y is accumulated as the drive signal sum Ty1. Then, the routine proceeds to a step 108 wherein the controller 20 reads in the residual vibration signal e from the acceleration sensor 22. Following this, the routine proceeds to a step 109 wherein the residual vibration signal e is accumulated as the sum Te of the residual vibration signals.

In a step 110, the first, second and third transfer function filters C1^, C2^ and C3^ are convoluted. That is, they are summed upon being coherent on the time axis in order to obtain the transfer function filter C^.

In a step 111, the controller 20 calculates a reference signal $R^T$ for updating by filtering the reference signal x through the transfer function filter C^ as mentioned above.

In a step 112, the controller 20 clears a counter j to 0. The counter j is a counter for judging as to whether the updating calculation of the filter coefficient Wi of the adaptive digital filter W has been executed necessary times or not.

In a step 113, the controller 20 updates the filter coefficient Wj of the adaptive digital filter W according to the above equation (1). After the execution of the updating process at the step 113, the routine proceeds to a step 114 wherein the controller 20 decides as to whether next reference signal x has been inputted or not. When the controller 20 decides that the reference signal x has not been inputted, the routine proceeds to a step 115 in order to execute an updating of next filter coefficient of the adaptive digital filter W or output processing of the drive signal y.

In the step 115, the controller 20 decides as to whether or not the counter j is greater than a maximum sampling number Tap which is obtained by dividing a maximum cycle of the reference signal x determined by the minimum rotation number of the engine 30 by the sampling clock. Accurately, since the counter j starts from 0, the counter j is compared with the a value (Tap-1) subtracting 1 from the maximum sampling number Tap. This decision is executed for deciding as to whether or not the filter coefficient Wj of the adaptive digital filter W is updated by necessary numbers after the output of the drive signal y based on the filter coefficient Wi at the step 106. When the decision in the step 115 is "NO", the routine proceeds to a step 116 wherein the counter j is incremented. Then the routine is returned to the step 113 wherein the above-mentioned processing is repeatingly executed. When the decision in the step 115 is "YES", that is, when it is decided that the filter coefficient of the adaptive digital filter W is updated by the necessary numbers, the routine proceeds to a step 117.

In the step 117, a DC component is eliminated from a sequence of numbers constituted by the filter coefficient Wi. Then, the routine proceeds to a step 118 wherein the upper limit Wmax of the filter coefficient Wi according to the offset drive signal ydc is calculated. Concretely, an outputable controlling force, which is obtained by subtracting a controlling force corresponding to the offset drive signal ydc at a present time from the maximum controlling force outputted by the electromagnetic actuator 10, is obtained, and a drive signal corresponding to the outputable controlling force is determined as the upper limit valve Wmax.

Next, the routine proceeds to a step 119 wherein the controller 20 decides as to whether either of the filter coefficients Wi is greater than the upper limit value Wmax or not. When it is decided that none of them is greater than the upper limit value Wmax, the routine proceeds to a step 120 wherein the correction coefficient β is set at 1. On the other hand, when it is decided that either of them is greater than the upper limit value Wmax, the routine proceeds to a step 121 wherein the correction coefficient β is set a number which is greater than 0 and smaller than 1. More definitely, at the step 121, the correction coefficient β is set so that the multiple of the correction coefficient β and each filter coefficient Wi is smaller than the upper limit value Wmax and takes a possibly near value to the upper limit Wmax. Then, the routine proceeds to a step 122 wherein the correction coefficient β is multiplied to each filter coefficient Wi and each filter coefficient Wi is replaced by the multiplied result.

The processing in the steps 117 to 122 is executed to prevent the following trouble. That is, if the drive signal y is generated by using the filter coefficient Wj updated at the step 113 as it is, in case that the outputable drive signal y has an upper limit on the viewpoint of the characteristic of the controller 20 and the electromagnetic actuator 10 and the like, the drive signal y greater than the upper limit value is forcibly corrected to the upper limit value and the drive signal y smaller than the upper limit value is outputted as it is. Accordingly, a high-frequency component, which does not exist practically, is convoluted and this degrades the vibration reducing control. Consequently, by executing the processing in the steps 117 to 122, even in case that the drive signal y becomes greater than the upper limit value, all of the drive signals y are decreased by same manner to correct only their levels. Therefore, the convolution of the unnecessary high-frequency component is easily prevented.

After the execution of the processing in the step 122, the routine proceeds to a step 123 wherein the counter i is incremented. Then, until a time corresponding to the predetermined sampling clock interval from the execution of the processing in the step 106 has elapsed, the routine is awaited. When the time corresponding to the sampling clock has elapsed, the routine returns to the step 105 wherein the above-mentioned processing is repeatingly executed.

When it is decided in the step 114 that the reference signal x is inputted, the routine proceeds to a step 124 wherein the controller 20 decides as to whether or not the cycle of the control, which corresponds to a cycle and a frequency of the vibration generated by the engine 30, is increased or decreased, by comparing the time period of the just before one cycle processing and the time period of the two-cycle before processing. That is, since the output times of the drive signal y is counted by the counter i and the output interval of the drive signal y is constant as one sampling cycle, the decision in the step 124 is executed by comparing the final value of the counter i at the newest one cycle processing with the final value of the counter i at the previous one cycle processing. Therefore, when both are not corresponding, it is decided that the cycle is changed and the decision "YES" is outputted. When both are corresponding, it is decided that the cycle is not changed and the decision "NO" is outputted.

When the decision in the step 124 is "YES", the routine proceeds to a step 125 wherein the respective filter coefficients of the first transfer function filter C2^ and the third transfer function filter C3^ are updated by reading out from the memory area according to the present value of the counter i. The fact that decision at the step 124 is "YES" means that the frequency of the vibration inputted to the engine mount 1 and generated at the engine 30 is changed. By the change of the frequency of the vibration, the displacement generation neutral position of the magnetic path member 12 is changed. Therefore, the resonance frequency component of the fluid resonance system and the resonance frequency component of the magnetic path member 12 are changed, and the transfer function based on the second transfer function filter C2^ and the third transfer function filter C3^ are changed. In order to execute an accurate adaptive control, it is preferable to correspond such transfer function filters to actual values. That is, by executing the processing of the step 125, each of the second transfer function filter C2^ and the third transfer function filter C3^ is changed so as to follow to the displacement generation displacement position of the magnetic path member 12.

In a step 126, an offset drive signal $Y_{dc}$ at the present time is substituted to the initial value $Y_{idc}$ of the offset drive signal y in the next one cycle processing. Following this, the routine proceeds to a step 127 wherein a counter k, which is a counter necessary to determine the polarity of the offset drive signal $Y_{dc}$, is cleared.

In a step 128, a parameter necessary for judging the converging characteristic of the adaptive control is cleared. Concretely, (m+2) numbers of parameters that a residual vibration signal sum EL(m) of the final value of the m-th cycle residual vibration signal sum Te, an average value AVEL of the residual vibration signal sum and a residual difference ΔEL of the residual vibration signal sum Te and the average value AVEL are cleared.

In a step 129, a parameter DCYN is cleared to 0. The parameter DCYN is a parameter for deciding as to whether it is necessary to execute an updating processing of the offset drive signal ydc or not. Then, the routine returns to the step 103 wherein the above-mentioned processing is executed.

In contrast, when the decision in the step 124 is "NO", the routine proceeds to a step 130 wherein the controller 20 decides whether the parameter DCYN is 0 or not. When the decision in the step 130 is "NO", it is not necessary to update the offset drive signal ydc. That is, since it is decided that the offset drive signal ydc at the present time is set in an optimum condition according to the vibration frequency at the present time, the routine returns to the step 103 and again the above-mentioned processing is executed.

When the decision in the step 130 is "YES", since it is decided that the processing for setting the offset drive signal ydc in the optimum condition after the change of the vibration frequency is not still executed, the routine proceeds to a step 131.

In the step 131, the controller 20 decides whether the adaptive control is converged or not. More particularly, the controller 20 decides whether the counter k is 0 or not. Herein, when the counter k indicates 0 (k=0), that is, when the adaptive control is not yet converged, the routine proceeds to a step 132 wherein the residual vibration signal EL(m) is shifted. More particularly, substituted in turn as follows: EL(M)=EL(M-1), EL(M-1)=EL(M-2), - - - , EL(m)=EL(m-1), - - - , EL(2)=EL(1), EL(1)=Te.

In a step 133, the controller 20 calculates the average value AVEL of the residual vibration signal sum and the residual ΔEL according to the following equations (7) and (8).

$$AVEL = \sum_{i=1}^{M} EL(i)/M \qquad (7)$$

$$\Delta EL = T_e - AVEL \tag{8}$$

Following this, the routine proceeds to a step 134 wherein the controller 20 decides whether the absolute value of the residual difference ΔEL is smaller than the sufficiently small value p or not. That is, the controller 20 decides whether the adaptive control is converged or not. The residual difference ΔEL is a difference between the residual vibration signal sum Te at the present time and the average value AVEL of the M-numbers of the residual vibration signal sum EL(1) to EL(m) in the past M-cycles. Therefore the fact that the absolute value of the residual difference ΔEL is sufficiently small means that the value of the residual vibration signal e is not change for a predetermined time. Accordingly, it is decided that the adaptive control is converged.

When the decision in the step 134 is "NO", the adaptive control is not still converged. That is, it is decided that the processing for moving the displacement generation neutral position of the magnetic path member 12 cannot be executed. Accordingly, the routine returns to the step 103.

When the decision in the step 134 is "YES", the adaptive control is converged. Accordingly, it is judged that the processing for moving the displacement generation neutral position of the magnetic path member 12 can be executed. Then, the routine proceeds to a step 135.

In the step 135, the counter k is incremented. Next, the routine proceeds to a step 136, wherein the controller 20 decides whether the counter k is larger than 2 or not. That is, since the counter k is arranged to be incremented only at the step 135, when the decision in the step 136 is "NO", it is decided that the execution of the processing after 123 is once or twice. Therefore, the routine proceeds to a step 137 wherein the controller 20 decides whether the counter k is 1 or not.

When the decision in the step 137 is "YES", that is, when the processing for moving the displacement generation neutral position of the magnetic path member 12 is first executed upon the vibration frequency becomes constant after the change of the frequency and then it is judged in the step 134 that the adaptive control is converged is changed, the routine proceeds to a step 138 wherein the offset drive signal ydc is calculated according to the following equation (9).

$$Y_{dc} = Y_{idc} - \Delta Y_{dc} \tag{9}$$

where Δydc is a deviation value constituted by a sufficiently small value as compared with the normally set offset drive signal ydc.

In the following processing, the magnitudes of the residual vibration signal sum Te before and after the change of the offset signal ydc are compared with each other by gradually decreasing or increasing the offset drive signal ydc by the deviation Δydc. The optimum offset drive signal ydc is automatically found by deciding the vibration reduced direction according to the compared result. Since the processing of the step 138 is first, the initial value ydc is temporarily set as a start value and the offset drive signal ydc is set by decreasing the deviation value Δydc therefrom. After the processing in the step 138, the routine returns to the step 103 wherein the above mentioned processing is executed.

Since the counter k has been incremented in the step 135 (k=k+1), the vibration of the frequency is not changed and therefore the routine proceeds to the step 131. Further, in the step 131 the NO decision is outputted. Therefore, the routine proceeds to a step 139 wherein the controller 20 decides whether or not the residual vibration signal sum Te at the newest cycle is smaller than the residual vibration signal sum E(1) at the pervious cycle, that is, it is decided whether the vibration is further decreased or not.

When the decision in the step 139 is "YES", the routine proceeds to a step 140 wherein it is decided whether the residual vibration signal sum Te and the residual vibration signal sum E(1) are equal or not. When the decision in the step 140 is "NO", since it is judged that the vibration is not yet set in the most reduced condition, the routine proceeds to the step 135 wherein the counter k is incremented (k=k+1). Then, the routine proceeds to the step 136, and the processing on and after the step 136 are executed. In this case, the processing after the step 135 is executed twice and therefore the counter k is set at 2. Accordingly, the decision in the step 137 becomes "NO" and the routine proceeds to a step 141 wherein the offset drive signal ydc is calculated according to the following equation (10).

$$Y_{dc} = Y_{idc} + \Delta y_{dc} \tag{10}$$

where the offset drive signal ydc is set by adding the deviation Δydc to the initial value ydc. After the processing in the step 141, the routine returns to the step 103 wherein the above mentioned processing is again executed.

When the decision in the step 139 is "NO", it is judged that the vibration is degrading. The routine proceeds to a step 142 wherein the controller 20 decides whether the counter k is greater than 2 or not. When the decision in the step 142 is "NO", it is judged that the processing at the step 141 has not been executed. Accordingly, the routine proceeds to the step 135 wherein the counter k is incremented and then the processing after the step 136 is executed. In this case, since the counter k is set at 2, the decision in the step 137 becomes "NO" and the processing at the step 141 is executed.

When the decision in the step 140 is "YES", that is, when it is judged that the vibration is set in the most reduced condition within a possible area, the routine proceeds to a step 143, the residual vibration signal sum Te at the present time is stored as the residual vibration signal sum EL(1). Next, the routine proceeds to a step 144.

In the step 144, the controller 20 decides whether the drive signal sum Ty1 at the newest cycle is smaller than the drive signal sum Ty2 at the previous cycle or not. That is, by executing the step 144, it becomes possible to judge whether the electric power consumption at the electromagnetic actuator 10 is decreased or not in a condition that the same vibration reducing effect is obtained. When the decision in the step 144 is "YES", since it is judged that the electric power consumption due to the moving of the displacement generation neutral position of the electromagnetic path member 12 tends to decrease, the processing after the step 136 is executed after the counter k is incremented in the step 135. In this case, since the value of the counter k is greater than 2, the routine proceeds to a step 145. The polarity of the offset drive signals ydc is decided in the step 145. When ydc<0, the routine proceeds to a step 146 wherein a new offset drive signal ydc is calculated according to the following equation (11). When ydc≧0, the routine proceeds to a step 147 wherein a new offset drive signal ydc is calculated according to the following equation (12).

$$y_{dc} = y_{dc} - \Delta y_{dc} \tag{11}$$

$$y_{dc} = y_{dc} + \Delta y_{dc} \tag{12}$$

With these calculations, the offset drive signal ydc is controlled to be increased or decreased so that the vibration is reduced. After the saturation of the vibration reduction effect, the offset drive signal ydc is increased and decreased so that the electric power consumption of the electromagnetic actuator 10 is decreased.

When the decision in the step 142 is "YES", it is judged that the degrading condition is again started after the offset drive signal ydc is increased or decreased so that the vibration is decreased. When the decision at the step 144 is "NO", it is judged that the electric power consumption tends to be increased. Accordingly, the routine proceeds to a step 148.

In the step 148, the polarity of the offset drive signal ydc is decided. When the decision in the step 148 is "YES" (ydc>0), the routine proceeds to a step 149. When the decision in the step 148 is "NO" (ydc≦0), the routine proceeds to a step 150. In the step 149, the offset drive signal ydc is decreased by the deviation value Δydc (ydc=ydc−Δydc). In the step 150, the offset drive signal ydc is obtained as a result of the addition of the deviation value Δydc to the offset value ydc (ydc=ydc+Δydc). With this processing, the vibrating condition is returned to a previous condition relative to a condition that the vibration tends to degrade or that the electric power consumption tends to increase. That is, the offset drive signal ydc is returned to a value at one-cycle previous operation. After the processing in the step 149 or step 150 is finished, the routine proceeds to a step 151 wherein the parameter DCYN is set at 1. With this processing, the controller 20 stores the fact that the moving processing of the displacement generation neutral position of the electromagnetic path member 12 is finished. Then, the routine returns to the step 103 wherein the above-mentioned processing is executed.

As a result of that the repeating execution of such processing, the drive signal y, which is constituted by convoluting the filter coefficient Wi of the adaptive digital filter W to the offset drive signal ydc at predetermined sampling-clock intervals from a time the reference signal x is inputted, is in turn supplied from the controller 20 to the electromagnetic actuator 10 of the engine mount 1. As a result of the supplement of the drive signals y, although the magnetic force corresponding to the drive signal y is generated at the exciting coil 10B, the predetermined magnetic force due to the permanent magnet 10C has already been applied to the magnetic path member 12. Therefore, it may be considered that the magnetic force due to the exciting coil 10B functions to strengthen or weaken the magnetic force of the permanent magnet 10C. That is, in a condition that the drive signal y is not supplied to the exciting coil 10C, the magnetic path member 12 is displaced at a neutral position where the supporting force of the plate spring 11 and the magnetic force of the permanent magnet 10C are balanced. When the drive signal y is supplied to the exciting coil 10B in this neutral condition, the magnetic path member 12 is displaced in the direction that the clearance relative to the electromagnetic actuator 10 is increased if the magnetic force generated at the exciting coil 10B by the drive signal y is directed against the direction of the magnetic force of the permanent magnet 10C, the magnetic path member 12. Inversely, if the direction of the magnetic force generated at the exciting coil 10B is the same as that of the magnetic force of the permanent magnet 10C, the magnetic path member 12 is displaced so that the clearance relative to the electromagnetic actuator 12 is decreased.

Thus, the magnetic path member 12 is movable in the right and inverse directions. Since the volume of the main fluid chamber 15 is changed by the displacement of the magnetic path member 12 and the expansion spring of the supporting elastomer 6 is deformed due to this volume change, the supporting force active in the right and inverse directions is generated at the engine mount 1. Each filter coefficient Wi of the adaptive digital filter W is in turn updated by the equation according to the synchronized type Filtered-X LMS algorithm. Therefore, after each filter coefficient Wi of the adaptive digital filter W is converged into an optimum value upon a predetermined time has elapsed, the idle vibration and the echo sound transferred from the engine 30 through the engine mount 1 to the structural member 35 is decreased by supplying the drive signal y to the engine mount 1.

Figure 9:
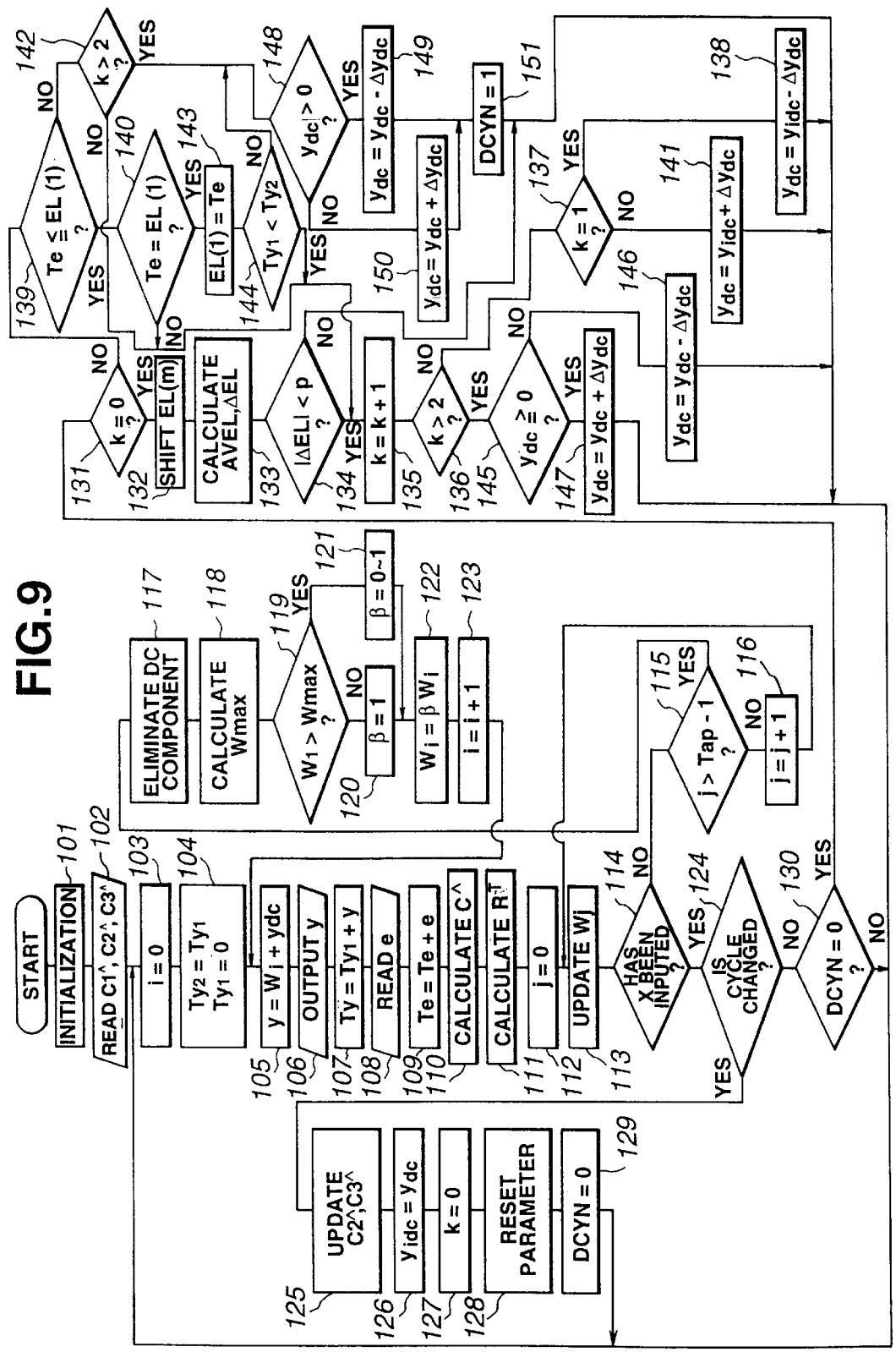
FIG. 9 is a flowchart which shows processing executed in a controller of the first embodiment.

Particularly, since the plate spring 11 for elastically supporting the magnetic path member 12 is set to be a nonlinear spring which has a characteristic as shown in FIG. 6, it becomes possible to change the dynamic spring characteristic and the damping characteristic of the fluid resonance system as shown in FIG. 8, by executing the processing of FIG. 9, that is, by appropriately setting the offset drive signal ydc, by including it in the drive signal y, and by changing the displacement generation neutral position of the magnetic path member 12 as shown in FIG. 7 for elastically deforming the plate spring 1.

With the processing of FIG. 9, after it is judged that the vibration frequency is constant and the adaptive control has been converged, the optimum value of the offset drive signal ydc is determined by properly increasing and decreasing the offset drive signal ydc upon checking the decreased direction of the residual vibration signal Te. That is, with the first embodiment of the engine mount 1 (vibration insulating support device) according to the present invention, even after the filter coefficient Wi of the adaptive digital filter W is converged into the optimum value, it becomes possible to further improve the vibration reduction effect by changing the characteristic of the fluid resonance system, more particularly by changing the displacement generation neutral position of the magnetic path member 12.

Further, with the arrangement of the engine mount 1 according to the present invention, after the vibration reduction effect is improved, the displacement generation neutral position of the magnetic path member 12 is changed into the direction that the electric power consumption of the electromagnetic actuator 10 is decreased, within the area where the vibration reduction effect is not degraded. That is, with the first embodiment according to the present embodiment, it becomes possible to extremely decrease the necessary controlling force of the actuator by properly moving the damping peak frequency which is determined by the characteristic of the fluid resonance system and shown in FIGS. 3 and 5. Therefore, without enlarging the electromagnetic actuator 10, it is possible to generate a control vibration capable of canceling or sufficiently decreasing the relatively large magnitude vibration such as an idle vibration of the diesel vehicle. This is very preferable for an engine mount 1 of a vehicle where a limitation of an equipment space is very important. Further, if the electromagnetic actuator 10 may be formed in small, it is very meritable in production cost.

Also, with the first embodiment according to the present embodiment, since the transfer function filter C^ is stored upon being divided into the first to third transfer function filters C1^, C2^ and C3^, and the second and third transfer function filters C2^ and C3^ which are changed according to the displacement generation neutral position of the magnetic path member 12 are updated at the step 125 as mentioned above, an adaptive control is preferably carried out even if the displacement generation neutral position of the magnetic path member 12 is changed.

Additionally, with the first embodiment according to the present embodiment, since the displacement generation neutral position of the magnetic path member 12 is moved by applying DC voltage according to the offset drive signal ydc to the electromagnetic actuator 10, this arrangement can be applied to various case by merely changing a flowchart thereof. This ensures a merit that it is not necessary to provide other new devices.

Furthermore, in case that it is decided in the step 124 that the cycle (frequency) of the vibration is constant and it is decided in the step 139 that the filter coefficient $W_i$ of the adaptive digital filter W is converged into an optimum, the control for moving the displacement generation neutral position of the magnetic path member 12 is executed. Accordingly, in a condition that the vibration frequency which is of a target value of the damping peak frequency is not changed and the vibration reducing effect is good, a displacement generation neutral position for obtaining a further preferable vibration reducing condition and decreasing the electric power consumption is searched. During this search, since the offset drive signal ydc is slightly increased or decreased, it is not afraid of the degradation of the sound in a vehicle compartment by extremely increasing the vibration transferred to the structural member 35 by the control for moving the displacement generation neutral position.

Furthermore, in the first embodiment according to the present invention, a neutral position controlling means and a DC voltage applying means are constituted by the steps 107, 109, 129 and 131 to 151, the pulse signal generator 21 corresponds to a reference signal generating means, the acceleration sensor 22 corresponds to a residual vibration detecting means, a drive signal generating means is constituted by the processing of the steps 105 and 106 and a processing procedure for executing these processing after the input of the reference signal x by predetermined sampling-clock intervals, the processing at the step 124 corresponds to a vibration condition deciding means, and the conversion deciding means is constituted by the processing at the steps 132 to 134.

Figure 10:
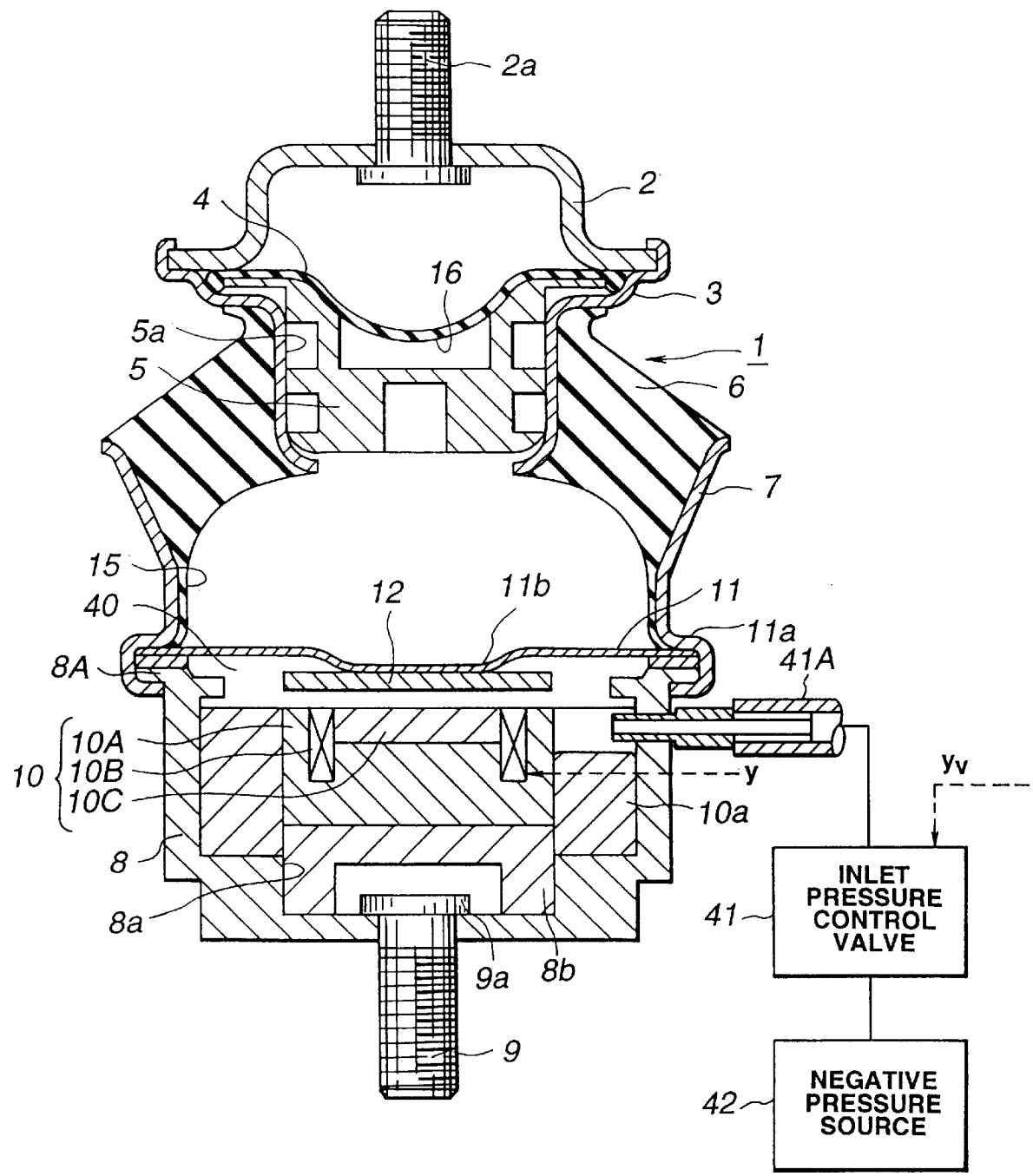
FIG. 10 is a cross-sectional view which shows a structure of the engine mount in a second embodiment.
Figure 11:
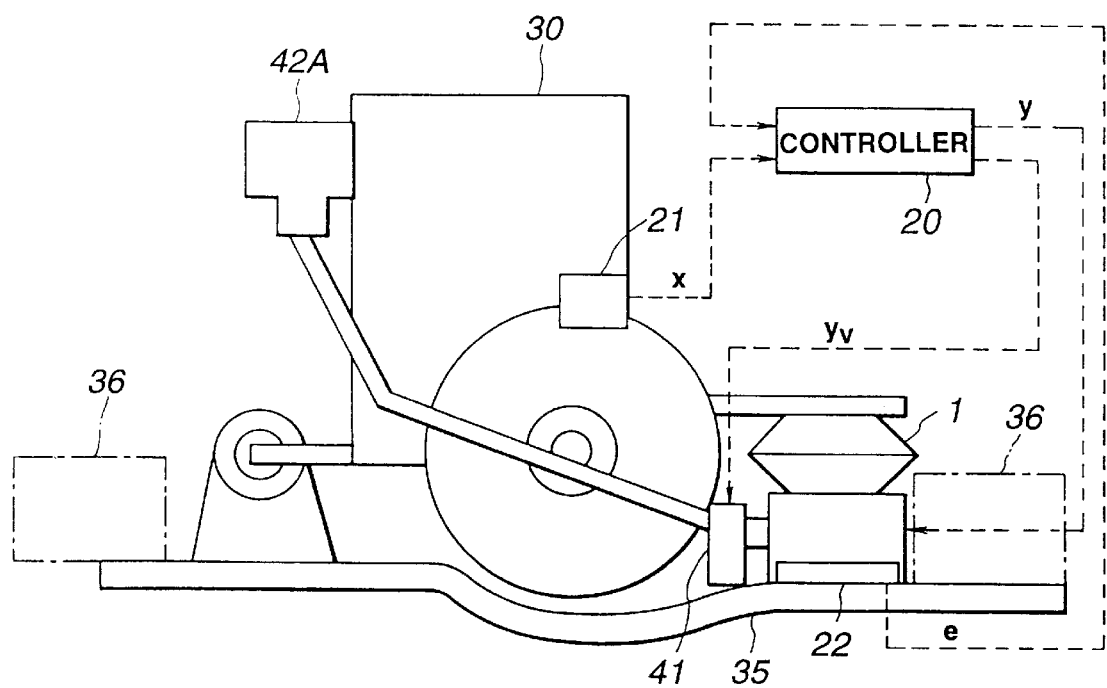
FIG. 11 is a whole structural view which shows an equipped condition of the engine mount in the second embodiment.
Figure 12:
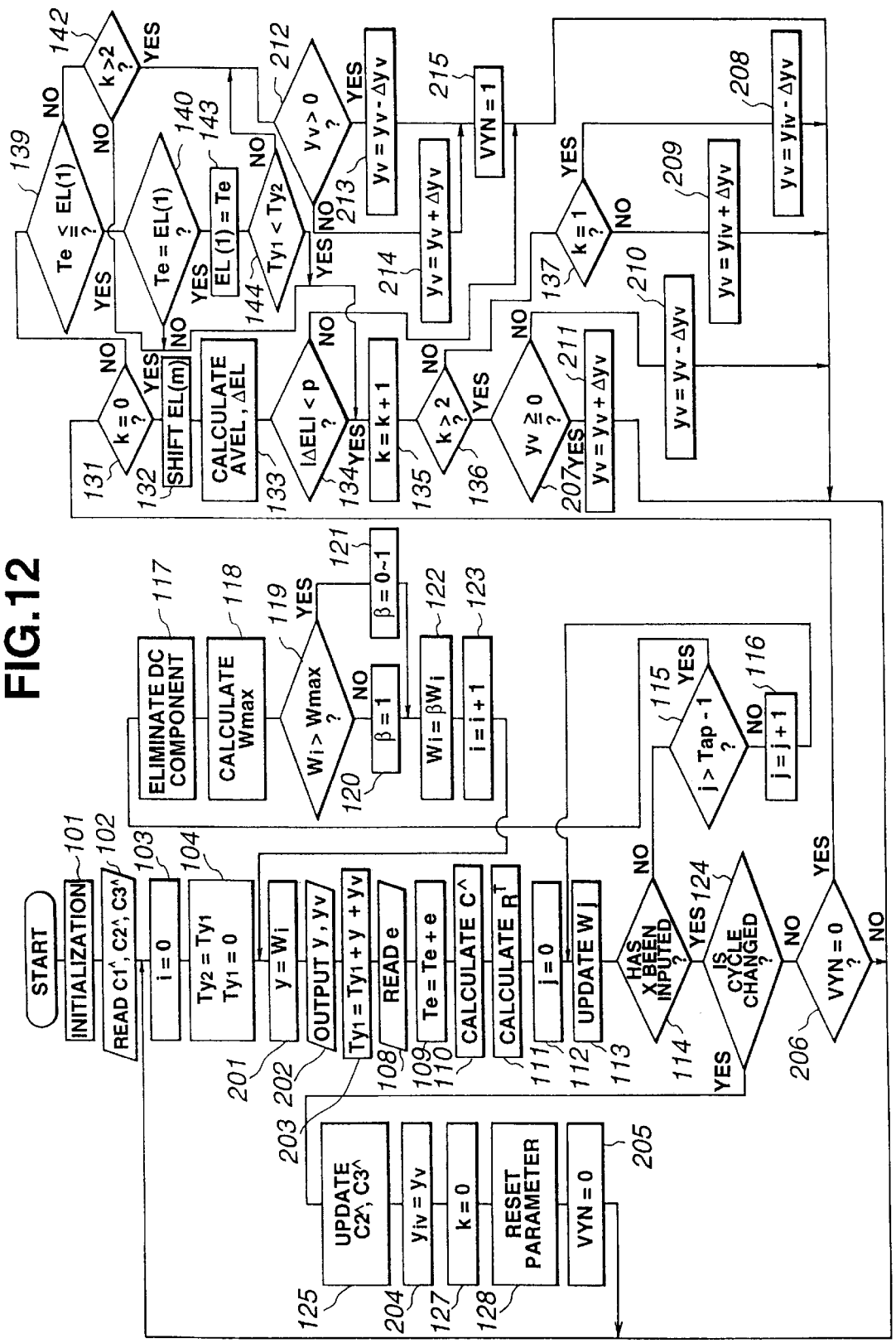
FIG. 12 is a flowchart which shows processing executed in the controller of the second embodiment.

Referring to FIGS. 10 to 12, there is shown a second embodiment of the vibration insulating support device such as an engine mount 1 according to the present invention. The second embodiment of the vibration insulating support device according to the present invention is applied to a so-called active engine mount for actively reducing the vibration transferred from the engine 30 to the vehicle body 36 as is similar to the first embodiment.

As shown in FIGS. 10 and 11, the structure of the second embodiment is generally similar to that of the first embodiment except that the displacement generation neutral position of the magnetic path member 12 is controlled at a desired position by controlling the pressure in a space defined by the plate spring 11, the magnetic path member 12 and the electromagnetic actuator 10. In the second embodiment, same members and steps as those of the first embodiment are designated by the same reference numerals and their explanations are omitted.

The space defined by the plate spring 11, the electromagnetic actuator 10, the magnetic path member 12 and the actuator case 8 is a sealed space 40. An intake end 41A of an inlet pressure control valve 41 is inserted from a side surface of the actuator case 8 so that its tip end portion is located in the sealed space 40. A discharge side of the inlet pressure control valve 41 is connected to a negative pressure source 42. An intake manifold 42A of the engine 30 is used as the negative pressure source 42 as shown in FIG. 11. The inlet pressure control valve 41 is arranged to properly control an inner pressure of the sealed space 40 by utilizing a drawing force of the negative pressure source 42 (intake manifold 42A). If the inner pressure of the sealed space 40 becomes greater in the negative pressure, that is, becomes more negative, the magnetic path member 12 is displaced toward the electromagnetic actuator 10 according to the deformation of the elastically deformable plate spring 11. Accordingly, the displacement generation neutral position of the magnetic path member 12 is moved by properly controlling the valve opening degree of the inlet pressure control valve 41.

The controller 20 is arranged to output the drive signal yv relative to the inlet pressure control valve 41. The setting method of the drive signal yv is actually the same as that of the offset drive signal ydc of the first embodiment. That is, the controller 20 of the second embodiment is arranged to execute the processing shown by a flowchart of FIG. 12.

The flowchart of FIG. 12 has several differences from the flowchart of the first embodiment shown in FIG. 9. More particularly, steps 201 to 215 are applied in the flowchart of FIG. 12, instead of the steps 105, 106, 107, 126, 129, 130, 145, 138, 141, 146, 147, 148, 149, 150 and 151 in the flowchart of FIG. 9.

In the step 201 executed following to the step 104, the filter coefficient Wi of the adaptive digital filter W is set as the drive signal y as it is. In the step 202 executed following to the step 201, the drive signal y to the electromagnetic actuator 10 and the drive signal yv to the inlet pressure control valve 41 are outputted. In the step 203, both of the drive signals y and yv are accumulated as a drive signal sum Ty1.

The steps 204 to 215 for setting the drive signal yv, the initial signal yiv and the parameter VYN are applied as shown in the flowchart of FIG. 12, instead of the steps for setting the offset drive signal ydc, the initial value ydc and the deviation $\Delta$ydc and the parameter DCYN in the first embodiment. In the second embodiment, a pressure control means as a neutral position control means is constituted by the inlet pressure control valve 41 and the negative pressure source 42 (intake manifold 42A).

With the arrangement of the second embodiment of the vibration insulating support device according to the present invention, the displacement generation neutral position of the magnetic path member 12 is moved so as to improve the vibration reducing effect and to decrease the electric power consumption of the electromagnetic actuator 10 and the inlet pressure control valve 41 as is similar to the execution of the first embodiment, after the vibration frequency becomes constant and the adaptive control is converged.

Also, since the displacement generation neutral position of the magnetic path member 12 is moved by the control of the inlet pressure control valve 41, the load of the electromagnetic actuator 10 is decreased. Further, since the intake manifold 42A of the engine 30 is utilized as a negative pressure source 42, the fuel consumption is not influenced by this position control operation through the inlet pressure control valve 41 and the negative pressure source 42.

Although the above-mentioned embodiments have been shown and described as to a case that the vibration insulating support device according to the present invention is applied to the engine mount 1 for supporting the engine 30, the application of the vibration insulating support device according to the present invention is not limited to the engine mount 1 and may be applied to a vibration insulating support device for a machine tool generating some vibrations.

While in the above-mentioned embodiments the drive signal y is generated according to the synchronized type Filtered-X LMS algorithm, it will be understood that such applicable algorithm to the drive signal is not limited to the synchronized type Filtered-X LMS algorithm and may be, for example, the normal Filtered-X LMS algorithm or LMS algorithm in the frequency area. Further, if the characteristic of the system is stable, the drive signal y may be generated by a fixed coefficient type digital filter or analog filter without using the adaptive algorithm such as the LMS algorithm.

What is claimed is:

1. A vibration insulating device interposed between a vibrating means and a structural member, the vibration insulating device comprising:

a main fluid chamber;

an elastic support partly defining the main fluid chamber;

an orifice connected to the main fluid chamber;

an auxiliary fluid chamber fluidly communicated with the main fluid chamber through said orifice, said auxiliary fluid chamber being of a volume-variable type;

fluid filled in said main fluid chamber, said orifice and said auxiliary fluid chamber;

a movable plate;

an elastic plate forming a lower sealed surface of said main fluid chamber and elastically supporting said movable plate, displacement of said movable plate displacing the lower sealed surface of said main fluid chamber via displacement of said elastic plate and changing the volume of said main fluid chamber, said elastic plate performing a non-linear spring characteristic;

a vibration detecting means for detecting a periodic vibration of the vibrating means;

an actuator generating a reverse phase vibration with respect to the periodic vibration transmitted from the vibrating means to said main fluid chamber by generating a displacement force for moving said movable plate; and a neutral position controlling means for generating a displacement force by which said movable plate is moved and held stationary constantly to vary a spring constant of said elastic plate, said neutral position controlling means varying a resonance frequency of a fluid resonance system, constituted by a mass of the fluid in said orifice and a spring constituted by (i) an expanding directional spring and (ii) said elastic plate, by varying a position of said movable plate to vary the spring constant of said elastic plate until the resonance frequency generally corresponds to the periodic frequency transmitted from the vibrating means to said main fluid chamber at which position the movable plate is then held stationary, each position at which said moveable plate is held stationary when said actuator is operating being set as a displacement generation neutral position for generating the reverse vibration.

2. A vibration insulating device as claimed in claim 1, the vibration insulating device being applied to a vehicle, the vibrating means including an engine of the vehicle, wherein a vibration frequency, at which the damping of the vibration of the fluid resonance system becomes maximum in a condition that the actuator of the fluid resonance system does not generate the displacing force, is generally corresponded to a vibration frequency during an idling of the vehicle.

3. A vibration insulating device as claimed in claim 1, wherein said movable plate includes a magnetizable material, said actuator including an electromagnetic actuator, said neutral position control means including a DC voltage applying means for applying a DC voltage to an exciting coil of the electromagnetic actuator.

4. A vibration insulating device as claimed in claim 3, wherein the transfer function filter includes a first transfer function filter corresponding to a component which is obtained by eliminating a resonance frequency component of the fluid resonance system and a resonance frequency component of said movable plate from a transfer function between the displacement force and the residual detecting means, a second transfer function filter corresponding to the resonance frequency component of the fluid resonance system and a third transfer function filter corresponding to the resonance frequency component of said movable plate.

5. A vibration insulating device as claimed in claim 4, wherein the second transfer function filter and the third transfer function filter is variable according to the displacement-generation neutral position.

6. A vibration insulating device as claimed in claim 1, wherein a sealed space is partitioned from said main fluid chamber by said movable plate, said neutral position control means including a pressure control means for controlling an inner pressure of the sealed space.

7. A vibration insulating device as claimed in claim 6, wherein the transfer function filter includes a first transfer function filter corresponding to a component which is obtained by eliminating a resonance frequency component of the fluid resonance system and a resonance frequency component of said movable plate from a transfer function between the displacement force and the residual detecting means, a second transfer function filter corresponding to the resonance frequency component of the fluid resonance system and a third transfer function filter corresponding to the resonance frequency component of movable plate.

8. A vibration insulating device as claimed in claim 7, wherein the second transfer function filter and the third transfer function filter is variable according to the displacement-generation neutral position.

9. A vibration insulating device as claimed in claim 1, further comprising:

a reference signal generating means for detecting a generating condition of vibrations of the vibrating means and generating a reference signal;

a residual vibration detecting means for detecting a residual vibration at the structural member and outputting a signal indicative of the residual vibration;

an adaptive digital filter of a variable filter coefficient;

a drive signal generating means for filter-processing the reference signal by the adaptive digital filter and generating a drive signal for driving said actuator;

a transfer function filter modeling a transfer function between the displacement force and the residual vibration detecting means;

an updated reference signal generating means for filter-processing the reference signal by thp transfer function filter and generating a reference signal for updating; and an adaptive processing means for updating the filter coefficient of the adaptive digital filter on the basis of the residual vibration signal and the reference signal for updating according to an adaptive algorithm so as to reduce a vibration level at the structural member.

10. A vibration insulating device as claimed in claim 9, further comprising:

a vibration condition deciding means for deciding whether the frequency of a cyclic vibration is constant; and a conversion deciding means for deciding whether the filter coefficient of the adaptive digital filter is converged into an optimum value, wherein the neutral position control means moves the displacement-generation neutral position so that the level of the residual vibration signal is decreased when the vibration condition deciding means decides that the frequency is constant and the conversion deciding means decides that the filter coefficient is converged into an optimum value.

11. A vibration insulating device as claimed in claim 10, wherein said neutral position control means again moves the displacement-generation neutral position so as to decrease the consumption energy of said actuator after the residual vibration signal is sufficiently decreased and within a range that its vibration level is not degraded.

12. A vibration insulating device interposed between a vibrating means and a structural member, the vibration insulating device comprising:

a main fluid chamber;

an elastic support partly defining the main fluid chamber;

an orifice connected to the main fluid chamber;

an auxiliary fluid chamber fluidly communicated with the main fluid chamber through said orifice, said auxiliary fluid chamber being of a volume-variable type;

fluid filled in said main fluid chamber, said orifice and said auxiliary fluid chamber;

a movable plate;

a partition plate forming a lower sealed surface of said main fluid chamber and connected to said movable plate, displacement of said movable plate displacing the lower sealed surface of said main fluid chamber via displacement of said partition plate and changing the volume of said main fluid chamber;

an elastic member elastically supporting said movable plate and performing a non-linear spring characteristic;

a vibration detecting means for detecting a periodic vibration of the vibrating means;

an actuator generating a reverse phase vibration with respect to the periodic vibration transmitted from the vibrating means to said main fluid chamber by generating a displacement force for moving said movable plate; and a neutral position controlling means for generating a displacement force by which said movable plate is moved and held stationary constantly to vary a spring constant of said elastic member, said neutral position controlling means varying a resonance frequency of a fluid resonance system, constituted by a mass of the fluid in said orifice and a spring constituted by (i) an expanding directional spring and (ii) said elastic member, by varying a position of said movable plate to vary the spring constant of said elastic member until the resonance frequency generally corresponds to the periodic frequency transmitted from the vibrating means to said main fluid chamber at which position the movable plate is then held stationary, each position at which said moveable plate is held stationary when said actuator is operating being set as a displacement generation neutral position for generating the reverse vibration.

13. A vibration insulating device interposed between a vibrating means and a structural member, the vibration insulating device comprising:

a main fluid chamber;

an elastic support partly defining the main fluid chamber;

an orifice connected to the main fluid chamber;

an auxiliary fluid chamber fluidly communicated with the main fluid chamber through said orifice, said auxiliary fluid chamber being of a volume-variable type;

fluid filled in said main fluid chamber, said orifice and said auxiliary fluid chamber;

a movable plate;

a combination partition plate and elastic member having an upper surface forming a lower sealed surface of said main fluid chamber, said combination partition plate and elastic member being connected to and elastically supporting said movable plate, displacement of said movable plate displacing the lower sealed surface of said main fluid chamber via displacement of said upper surface of said combination partition plate and elastic member to change the volume of said main fluid chamber, said combination partition plate and elastic member performing a non-linear spring characteristic;

a vibration detecting means for detecting a periodic vibration of the vibrating means;

an actuator generating a reverse phase vibration with respect to the periodic vibration transmitted from the vibrating means to said main fluid chamber by generating a displacement force for moving said movable plate; and a neutral position controlling means for generating a displacement force by which said movable plate is moved and held stationary constantly to vary a spring constant of said combination partition plate and elastic member, said neutral position controlling means varying a resonance frequency of a fluid resonance system, constituted by a mass of the fluid in said orifice and a spring constituted by (i) an expanding directional spring and (ii) said combination partition plate and elastic member, by varying a position of said movable plate to vary the spring constant of said combination partition plate and elastic member until the resonance frequency generally corresponds to the periodic frequency transmitted from the vibrating means to said main fluid chamber at which position the movable plate is then held stationary, each position at which said moveable plate is held stationary when said actuator is operating being set as a displacement generation neutral position for generating the reverse vibration.

14. A vibration insulating device interposed between a vibrating means and a structural member, the vibration insulating device comprising:

a main fluid chamber;

an elastic support partly defining the main fluid chamber;

an orifice connected to the main fluid chamber;

an auxiliary fluid chamber fluidly communicated with the main fluid chamber through said orifice, said auxiliary fluid chamber being of a volume-variable type;

fluid filled in said main fluid chamber, said orifice and said auxiliary fluid chamber;

a movable plate;

means, connected to said movable plate, for forming a lower sealed surface of said main fluid chamber and for elastically supporting said movable plate, displacement of said movable plate displacing the lower sealed surface of said main fluid chamber to change the volume of said main fluid chamber, said means for forming a lower sealed surface of said main fluid chamber and for elastically supporting said movable plate performing a non-linear spring characteristic;

a vibration detecting means for detecting a periodic vibration of the vibrating means;

an actuator generating a reverse phase vibration with respect to the periodic vibration transmitted from the vibrating means to said main fluid chamber by generating a displacement force for moving said movable plate; and a neutral position controlling means for generating a displacement force by which said movable plate is moved and held stationary constantly to vary a spring constant of said means for forming a lower sealed surface of said main fluid chamber and for elastically supporting said movable plate, said neutral position controlling means varying a resonance frequency of a fluid resonance system, constituted by a mass of the fluid in said orifice and a spring constituted by (i) an expanding directional spring and (ii) said means for forming a lower sealed surface of said main fluid chamber and for elastically supporting said movable plate, by varying a position of said movable plate to vary the spring constant of said means for forming a lower sealed surface of said main fluid chamber and for elastically supporting said movable plate until the resonance frequency generally corresponds to the periodic frequency transmitted from the vibrating means to said main fluid chamber at which position the movable plate is then held stationary, each position at which said moveable plate is held stationary when said actuator is operating being set as a displacement generation neutral position for generating the reverse vibration.

* * * * *